United States Patent
Chiu et al.

(10) Patent No.: US 11,873,360 B2
(45) Date of Patent: Jan. 16, 2024

(54) RESIN COMPOSITION FOR MOLDING DEVICE FOR DENTAL VENEER RESTORATION

(71) Applicant: BenQ Materials Corporation, Taoyuan (TW)

(72) Inventors: Feng-Yu Chiu, Taoyuan (TW); Ju-Hui Huang, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 63 days.

(21) Appl. No.: 17/720,750

(22) Filed: Apr. 14, 2022

(65) Prior Publication Data

US 2023/0119841 A1     Apr. 20, 2023

(30) Foreign Application Priority Data

Oct. 15, 2021   (TW) ................. 110138318

(51) Int. Cl.
| | |
|---|---|
| *A61C 5/77* | (2017.01) |
| *C08F 2/46* | (2006.01) |
| *C08F 2/50* | (2006.01) |
| *C08G 61/04* | (2006.01) |
| *C08F 265/06* | (2006.01) |

(52) U.S. Cl.
CPC .................. *C08F 265/06* (2013.01)

(58) Field of Classification Search
CPC . A61C 5/77; A61C 5/20; C08F 265/06; C08F 290/067; C08F 220/36; C08F 222/102
USPC ................... 522/116, 114, 113, 1; 520/1
See application file for complete search history.

(56) References Cited

U.S. PATENT DOCUMENTS

| | | | |
|---|---|---|---|
| 2017/0009001 A1* | 1/2017 | Takenouchi | C08G 18/672 |
| 2020/0282636 A1* | 9/2020 | Nishimoto | C08K 5/0041 |

* cited by examiner

*Primary Examiner* — Jessica Whiteley

(57) ABSTRACT

The disclosure related to a resin composition for molding device for dental restoration comprising 10 to 50 parts by weight of an urethane acrylate oligomer with a functionality less than 4, 20 to 40 parts by weight of morpholino-group containing acrylate monomera morpholino-group containing acrylate monomer, 10 to 40 parts by weight of a polymerizable acrylate monomer composition and 0.5 to 5 parts by weight of a photoinitiator, wherein the polymerizable acrylate monomer composition comprises 40 to 60 parts by weight of an alicyclic acrylate monomer and 40 to 60 parts by weight of ether-bond containing aliphatic acrylate monomeran ether-bond containing aliphatic acrylate monomer. The shore hardness of the resin composition after being cured of the present invention is not less than 70D and the flexural strain thereof is not less than 0.15.

12 Claims, No Drawings

RESIN COMPOSITION FOR MOLDING DEVICE FOR DENTAL VENEER RESTORATION

CROSS-REFERENCE TO RELATED APPLICATION

This application claims the priority benefit of Taiwanese Application Serial Number 110138318, filed on Oct. 15, 2021, which is incorporated herein by reference.

TECHNICAL FILED

The present invention relates to a resin composition for molding device for dental veneer restoration.

BACKGROUND OF THE INVENTION

In dentistry, dental veneer prostheses are used to restore the slightly damaged teeth resulting from caries, fracture by the accident or excessive abrasion. The dental veneers are made by porcelain or composite resin in general and are durable. In the state of the art, for a dental restoration by dental veneers, a thickness of 0.3 mm to 0.5 mm of the enamel of the teeth is removed at first, then a teeth impression mold for the teeth is taken and the dental veneers are manufactured based on the mold. When a veneer is made, the fit of the dental veneer is needed to check if the veneer can be correctly fitted to the tooth, and then the dental veneer can be adhered to the tooth. The excess adhesive will be removed and the restored teeth will be trimmed and refined. The restoration is complicated in process.

In the abovementioned restoration process, if the dental veneers fail to correctly fit to the target teeth, the appearance of the teeth will be affected and the caries or the other periodontal problems may be induced. Moreover, the enamel of the teeth is to protect the teeth, the removing of the enamel may bring about an unexpected impact to the teeth.

A dental veneer restoration with reducing removal of the enamel, increasing the fit of the dental veneers and the target teeth and applying conveniently have been proposed. The proposed process comprises the steps of preparing a molding device for dental veneers restoration with a high accuracy of shape and dimensional base on the ideal appearance of the teeth to be restored, pressing the dental resin in the molding device upon the target teeth from the edge towards the root of the teeth, making the teeth to be restored covered by the dental resin completely, curing the dental resin by irradiation of UV light, and forming the dental veneer directly on the teeth to be restored after demolding and removing the molding device.

Therefore, there is a need for a resin composition for molding device for dental veneer restoration, which can provide the molding device with an excellent accuracy of shape and dimensional, and an outstanding demoldability and firmness when being removed after the restoration processes.

SUMMARY OF THE INVENTION

The disclosure provided is a resin composition for a molding device for dental veneer restoration. The present resin composition comprises an urethane acrylate oligomer with a functionality less than 4, a morpholino-group containing acrylate monomer, a polymerizable acrylate monomer composition and a photoinitiator. The shore hardness of the resin composition after being cured of the present invention is not less than 70D and the flexural strain thereof is not less than 0.15. The present composition can provide the molding device an excellent accuracy of shape and dimensional, and an outstanding demoldability and firmness when being removed after the restoration processes.

The disclosure provided is a resin composition for molding device for dental veneer restoration, which comprises 10 to 50 parts by weight of an urethane acrylate oligomer with a functionality less than 4, 20 to 40 parts by weight of a morpholino-group containing acrylate monomer, 10 to 40 parts by weight of a polymerizable acrylate monomer composition and 0.5 to 5 parts by weight of a photoinitiator, wherein the polymerizable acrylate monomer composition comprises 40 to 60 parts by weight of an alicyclic acrylate monomer and 40 to 60 parts by weight of an ether-bond containing aliphatic acrylate monomer. The shore hardness of the cured resin composition is not less than 70D and the flexural strain thereof is not less than 0.15.

In the present resin composition for a molding device for dental veneer restoration, the tensile strength of the cured resin composition is not less than 25 MPa.

In the present resin composition for a molding device for dental veneer restoration, the elongation at break of the cured urethane acrylate oligomer is not less than 30%.

In the present resin composition for a molding device for dental veneer restoration, the functionality of the urethane acrylate oligomer is 2 or 3.

In the present resin composition for a molding device for dental veneer restoration, the morpholino-group containing acrylate monomer is acryloylmorpholine In the present resin composition for a molding device for dental veneer restoration, the functionality of the alicyclic acrylate monomer is 1 or 2.

In the present resin composition for a molding device for dental veneer restoration, the ether-bond containing aliphatic acrylate monomer can be selected from one of the group consisting of isobornyl acrylate, cyclohexyl acrylate, tricyclodecane dimethanol diacrylate, and 1,3-adamantanediol diacrylate, or combinations thereof.

In the present resin composition for a molding device for dental veneer restoration, the glass transition temperature of the ether-bond containing aliphatic acrylate monomer is not less than 40° C.

In the present resin composition for a molding device for dental veneer restoration, the ether-bond containing aliphatic acrylate monomer can be selected from one of the group consisting of diethylene glycol diacrylate, tripropylene glycol diacrylate, 1,6-hexanediol diacrylate, and 1,9-nonanediol diacrylate, or combinations thereof.

In the present resin composition for a molding device for dental veneer restoration, the photoinitiator can be selected from one of the group consisting of acetophenones-based photoinitiator, diphenylketones-based photoinitiator, propiophenones-based photoinitiator, benzophenones-based photoinitiator, difunctional α-hydroxyketones-based photoinitiator, and acylphosphine oxides-based photoinitiator, or combinations thereof.

In the present resin composition for a molding device for dental veneer restoration, the ratio of the weight of the urethane acrylate oligomer to the total weight of morpholino-group containing acrylate monomer and the polymerizable acrylate monomer composition is ranging between 0.2 and 0.7.

In the present resin composition for a molding device for dental veneer restoration, 0.01 to 5 parts by weight of a filler can be further comprised in the resin composition.

The above and other aspects of the invention will become better understood with regard to the following detailed description of the preferred but non-limiting embodiment(s). These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be affected without departing from the spirit and scope of the novel concepts of the disclosure.

DETAILED DESCRIPTION OF THE INVENTION

In the following detailed description, for purposes of explanation, numerous specific details are set forth in order to provide a thorough understanding of the disclosed embodiments. It will be apparent, however, that one or more embodiments may be practiced without these specific details.

It is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

The resin composition for a molding device for dental veneer restoration disclosed in the present invention comprises an urethane acrylate oligomer with a functionality less than 4, morpholino-group containing acrylate monomera morpholino-group containing acrylate monomer, a polymerizable acrylate monomer composition and a photoinitiator, wherein the polymerizable acrylate monomer composition comprises 40 to 60 parts by weight of an alicyclic acrylate monomer and 40 to 60 parts by weight of can ether-bond containing aliphatic acrylate monomer. The shore hardness of the resin composition after being cured is not less than 70D and the flexural strain thereof is not less than 0.15.

In the present resin composition for a molding device for dental veneer restoration, the urethane acrylate oligomer with a functionality less than 4 can form the main network of the IPN (Interpenetrating Polymer Network) structure with high toughness after the resin composition cured, and the alicyclic acrylate monomer and the ether-bond containing aliphatic acrylate monomer comprised in the polymerizable acrylate monomer composition will form the secondary network interpenetrating into the main network to increase the cohesive strength and reduce the shrinkage rate after curing. Furthermore, the acrylate monomer contains morpholino groups, because the reactive hydrogen in the acrylate monomer can compete with the free radicals to react with the atmospheric oxygen during curing, so that the curing of the resin surface is enhanced to prevent the cured resin from adhering to the enamel of the teeth. Therefore, the present resin composition for a molding device for a dental veneer restoration can provide the molding device with an excellent accuracy of shape and dimensional, and an outstanding demoldability and firmness when being removed after the restoration processes.

In the present resin composition for a molding device for dental veneer restoration, the tensile strength of the resin composition after being cured is not less than 25 MPa.

The urethane acrylate oligomer suitable used in the acrylate resin of the present invention is an oligomer derived from one or more polyol, one or more polyol hydroxyl-containing acrylate and a polyisocyanate. In an embodiment of the present invention, the molecular weight of the urethane acrylate oligomer is ranging between 2,000 and 12,000.

In an embodiment of the present invention, the glass transition temperature of the urethane acrylate oligomer is ranging between 5° C. and 50° C. and preferably ranging between 10° C. and 35° C.

In the present resin composition for a molding device for dental veneer restoration, the elongation at break of the urethane acrylate oligomer after being cured is not less than 30%, preferably not less than 40%. If the elongation at break of the urethane acrylate oligomer after being cured is insufficient, the cured resin composition has a poor toughness.

In the present resin composition for a molding device for dental veneer restoration, the functionality of the urethane acrylate oligomer is 2 or 3. If the functionality of the urethane acrylate oligomer is less or more, the density of the main network of IPN structure formed by the cured urethane acrylate oligomer is not as expected.

The suitable urethane acrylate oligomer can be, but not limited to, for example, commercially available urethane acrylate oligomer products, such as "6112-100" manufactured by Eternal Materials Co., Ltd., Taiwan, "Ebecryl-8811" manufactured by Allnex Germany GmbH, Germany, and "PU-2560" and "SC-2565" manufactured by Miwon Specialty Chemical Co., Ltd., Korea.

In the present resin composition for a molding device for dental veneer restoration, the suitable morpholino-group containing acrylate monomer can be acryloylmorpholine or 2-N-morpholinoethyl acrylate. In a preferred embodiment of the present invention, the morpholino-group containing acrylate monomer is acryloylmorpholine.

The alicyclic acrylate monomer suitable used in the present invention is an acrylate monomer containing alicyclic structure. The alicyclic structure of the acrylate monomer can enhance the rigidity of the resin composition and decrease the shrinkage rate after curing thereof. From the above point of view, the alicyclic structure preferably is a saturated aliphatic ring, for examples, such as cyclopropane, cyclobutane, cyclopentane, cyclohexane, cycloheptane, dicyclodecane, tricyclodecane, adamantane, isobornyl, norbornyl and the like.

In the present resin composition for a molding device for dental veneer restoration, the functionality of the alicyclic acrylate monomer is 1 or 2.

In the present resin composition for a molding device for dental veneer restoration, the suitable alicyclic acrylate monomer can be, for example, such as isobornyl acrylate, dicyclopentyl acrylate, cyclohexyl acrylate, 2-methyl-2-adamantanol acrylate, 2-ethyl-2-adamantanol acrylate, 1-adamantane acrylate, 4-tert-butylcyclohexyl acrylate, 3,3,5-trimethylcyclohexyl acrylate, tricyclodecane dimethanol diacrylate, cyclohexane dimethanol diacrylate, 1,3-adamantane glycol diacrylate or combinations thereof. In the preferred embodiment of the present invention, the alicyclic acrylate monomer is isobornyl acrylate, cyclohexyl acrylate, tricyclodecane dimethanol diacrylate,1,3-adamantanediol diacrylate or combinations thereof The suitable ether-bond containing aliphatic acrylate monomer disclosed in the present invention is derived from polyol and unsaturated carboxylic acid. In the preferred embodiment of the present invention, the glass transition temperature of the ether-bond containing aliphatic acrylate monomer is not less than 40° C. If the glass transition temperature of the aliphatic acrylate monomer is lower, may decrease the tensile modulus of the resin composition.

The suitable ether-bond containing aliphatic acrylate monomer disclosed in the present invention can be selected from those commonly used in the related art, for example, but not limited to, such as difunctional acrylate monomer like diethylene glycol diacrylate, dipropylene glycol diacrylate, tripropylene glycol diacrylate, tetraethylene glycol diacrylate, neopentyl glycol diacrylate, 1,3-butanediol diacrylate, 1, 4-butanediol diacrylate, 1,6-hexanediol diacrylate and 1,9-nonanediol diacrylate, or multifunctional acrylate monomer like trimethylolpropane triacrylate, pentaerythritol triacrylate, pentaerythritol tetraacrylate, dipentaerythritol pentaacrylate and dipentaerythritol hexaacrylate. In the preferred embodiment of the present invention, the ether-bond containing aliphatic acrylate monomer can be selected from, at least one of the group consisting of diethylene glycol diacrylate, tripropylene glycol diacrylate, 1,6-hexanediol diacrylate,1,9-nonanediol diacrylate or combinations thereof.

In the present resin composition for a molding device for dental veneer restoration, the photoinitiator can be selected from, at least one of the group consisting of acetophenones-based photoinitiator, diphenylketones-based photoinitiator, propiophenones-based photoinitiator, benzophenones-based photoinitiator, difunctional α-hydroxyketones-based photoinitiator, acylphosphine oxides-based photoinitiator or combinations thereof.

In the present resin composition for a molding device for dental veneer restoration, the ratio of the weight of the urethane acrylate oligomer to the total weight of morpholino-group containing acrylate monomer and the polymerizable acrylate monomer composition is ranging between 0.2 and 0.7.

In the present resin composition for a molding device for dental veneer restoration, from the view of enhancing the shore hardness, 0.01 to 5 parts by weight of a filler can be further comprised in the resin composition.

The suitable filler disclosed in the present invention can be selected from those commonly used in the related art, but not limited to an organic filler or an inorganic filler. The suitable organic filler can be, for example, such as the microparticles of the polymers like polymethyl methacrylate, polyethyl methacrylate, methyl methacrylate-ethyl methacrylate copolymer, ethylene-vinyl acetate copolymer, styrene-butadiene copolymer and the like. The suitable inorganic filler can be, for example, such as the microparticles of the inorganic materials like silica, ceramics, diatomaceous earth, kaolin, clay minerals, activated clay, synthetic zeolite, mica, calcium fluoride, ytterbium fluoride, calcium phosphate, barium sulfate, zirconium dioxide, titanium dioxide, hydroxyapatite and the like. In addition, an organic-inorganic composite filler, is a premix of the organic filler and inorganic filler, can also be used for the filler disclosed in the present invention.

The method for preparing the resin composition disclosed in the present invention comprises mixing a urethane acrylate oligomer with a functionality less than 4, a morpholino-group containing acrylate monomer, a polymerizable acrylate monomer composition and a photoinitiator and stirred evenly for preparing the resin composition.

The method for manufacturing the molding device for dental veneer restoration composed by the resin composition disclosed in the present invention comprises the steps of obtaining a three-dimensional (3D) images of the upper and lower dentition; selecting the image of the tooth to be restored and the adjacent two teeth thereof and simulating the ideal appearance of the tooth to be restored base on the image to obtain a virtual tooth design image; connecting parts are designed on the edge of the virtual tooth design image and the image of the adjacent two teeth of the tooth to be restored, to form a 3D design image for a dental molding device; the data information of the 3D design image for a dental molding device is sent to the automated manufacturing system, and a molding device for dental veneer restoration can be manufactured using the resin composition.

In an embodiment of the method for manufacturing the molding device for dental veneer restoration composed by the resin composition disclosed in the present invention, the automated manufacturing system can be, for example, a 3D printing system. The available 3D printing system can be, but not limited to stereo lithography appearance printing equipment, polyjet printing equipment and the like. The suitable 3D printing system can be, for example, but not limited to, such as the 3D printing system manufactured by 3D Systems Corporation, US, by Xyzprinting, Inc., Taiwan, by MiiCraft, Taiwan or by Stratasys Ltd., US.

The present invention will be explained in further detail with reference to the examples. However, the present invention is not limited to these examples.

EXAMPLE

Example 1

20 g of urethane acrylate oligomer with a functionality of 2 (SC-2565, molecular weight of 5,100, commercially obtained from Miwon, Korea), 32 g of acrylomorpholine, 16 g of tricyclodecane dimethanol diacrylate, 16 g of tripropylene glycol diacrylate and 2 g of photoinitiator (DOUBLECURE TPO, commercially obtained from Double Bond Chemical, Taiwan) were mixed and stirred for 1 hour to prepare the resin composition.

A 3D design image for a preset product using the resin composition was obtained in advance.

3D printing equipment (Miicraft ultra 125, commercially obtained from Miicraft, Taiwan) according to the 3D design image and using the resin composition to print, with a printing thickness of 50 um per layer and the curing time of 1.2 seconds per layer, and after the post-curing of 48Mw/cm2 and 1 minute, the preset product composed by the cured resin composition could be obtained.

The properties of the obtained preset product composed by the cured resin composition were determined in accordance with the tensile strength, the flexural strain, the shore hardness and the shrinkage rate after curing measurement described hereinafter, and the test results were shown in Table 1.

Example 2

The resin composition was prepared in the same manner as in Example 1, and 1 g of silica (CAB-O-SIL TS-610, B.E.T. surface 125 m$^2$/g, average particle (aggregate) length 0.2-0.3 um, commercially obtained from Cabot, US) be further comprised therein.

The preset product composed by the cured resin composition was formed in the same manner as in Example 1, except that the curing time was 1 second per layer in the 3D printing process.

The properties of the obtained preset product composed by the cured resin composition were determined in accordance with the tensile strength, the flexural strain, the shore hardness and the shrinkage rate after curing measurement described hereinafter, and the test results were shown in Table 1.

Example 3

25 g of urethane acrylate oligomer with a functionality of 2 (SC-2565), 34 g of acrylomorpholine, 11 g of tricyclodecane dimethanol diacrylate, 11 g of tripropylene glycol diacrylate, 1 g of silica (CAB-O-SIL TS-610) and 2 g of photoinitiator (DOUBLECURE TPO) were mixed and stirred for 1 hour to prepare the resin composition.

The resin composition was used in forming the preset product, in the same manner as in Example 2. The properties of the obtained preset product composed by the cured resin composition were determined in accordance with the tensile strength, the flexural strain, the shore hardness and the shrinkage rate after curing measurement described hereinafter, and the test results were shown in Table 1.

Example 4

30 g of urethane acrylate oligomer with a functionality of 2 (SC-2565), 24.5 g of acrylomorpholine, 12 g of tricyclodecane dimethanol diacrylate, 12.6 g of tripropylene glycol diacrylate, 1 g of silica (CAB-O-SIL TS-610) and 2 g of photoinitiator (DOUBLECURE TPO) were mixed and stirred for 1 hour to prepare the resin composition.

The resin composition was used in forming the preset product, in the same manner as in Example 2. The properties of the obtained preset product composed by the cured resin composition were determined in accordance with the tensile strength, the flexural strain, the shore hardness and the shrinkage rate after curing measurement described hereinafter, and the test results were shown in Table 1.

Example 5

35 g of urethane acrylate oligomer with a functionality of 2 (SC-2565), 19.5 g of acrylomorpholine, 9.8 g of tricyclodecane dimethanol diacrylate, 9.8 g of tripropylene glycol diacrylate, 1 g of silica (CAB-O-SIL TS-610) and 2 g of photoinitiator (DOUBLECURE TPO) were mixed and stirred for 1 hour to prepare the resin composition.

The resin composition was used in forming the preset product, in the same manner as in Example 2. The properties of the obtained preset product composed by the cured resin composition were determined in accordance with the tensile strength, the flexural strain, the shore hardness and the shrinkage rate after curing measurement described hereinafter, and the test results were shown in Table 1.

Example 6

40 g of urethane acrylate oligomer with a functionality of 2 (SC-2565), 18 g of acrylomorpholine, 9 g of tricyclodecane dimethanol diacrylate, 9 g of tripropylene glycol diacrylate, 1 g of silica (CAB-O-SIL TS-610) and 2 g of photoinitiator (DOUBLECURE TPO) were mixed and stirred for 1 hour to prepare the resin composition.

The resin composition was used in forming the preset product, in the same manner as in Example 2. The properties of the obtained preset product composed by the cured resin composition were determined in accordance with the tensile strength, the flexural strain, the shore hardness and the shrinkage rate after curing measurement described hereinafter, and the test results were shown in Table 1.

Tensile strength measurement: The preset product composed by the cured resin composition was a specimen. According to the specification of ASTM D638, the suitable specimen was a type IV specimen, and the tensile strength was measured by Cometech QC-508M2 (manufactured by Cometech Testing Machines Co., Ltd., Taiwan) with a load cell of 2 kN.

Flexural strain measurement: The preset product composed by the cured resin composition was a specimen. According to the specification of ASTM D790, the specimen size was 3.2 mm thick, 127 mm long and 12.7 mm wide, and the flexural strain was measured by Cometech QC-508M2 (manufactured by Cometech Testing Machines Co., Ltd., Taiwan).

Shore hardness measurement: The resin composition was cured to form a specimen of 5 mm thick, 5 mm long and 5 mm wide, and the shore hardness was measured according to the test method of ASTM D2240 by Teclock GS-702G shore durometer (manufactured by Teclock Co., Ltd., Japan).

Shrinkage rate after curing measurement: Preparing a 3D design image of a hollow concentric cylinder with an outer diameter of 10 mm, an inner diameter of 4 mm, and a thickness of 3 mm, and a sample was formed by curing the resin composition according to the 3D design image. The outer diameter of the sample was determined with a 0.01 mm precision vernier caliper, and the shrinkage rate after curing of the resin composition was calculated according to the following formula:

$$\text{Shrinkage rate after curing (\%)} = (10-D)/10 \times 100\%$$

D: The outer diameter of the sample (mm)

TABLE 1

The properties of the preset product composed by the cured resin composition obtained from Examples 1 to 6

| Example | | Example 1 | Example 2 | Example 3 | Example 4 | Example 5 | Example 6 |
|---|---|---|---|---|---|---|---|
| Mechanical Properties | Tensile Strength (MPa) | 45.3 | 54.2 | 40.1 | 34 | 32.8 | 30.3 |
| | Flexural Strain | 0.21 | 0.17 | 0.22 | 0.24 | 0.25 | 0.21 |
| Shore Hardness (D) | | 75 | 77 | 74 | 75 | 76 | 79 |
| Shrinkage Rate After Curing (%) | | 0.51 | 1.12 | 0.52 | 0.42 | 0.66 | 0.5 |

As shown in Table 1, the preset products composed by the cured resin compositions obtained from Examples 1 to 6 had high tensile strength and flexural strain, sufficient shore hardness, and low shrinkage rate after curing, therefore, the resin compositions obtained from Examples 1 to 6 were used in manufacturing the molding devices for dental veneer restoration, can provide the molding device an excellent accuracy of shape and dimensional, and an outstanding demoldability and firmness when being removed after the restoration processes.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. A resin composition for a molding device for dental veneer restoration, comprising:
    10 to 50 parts by weight of an urethane acrylate oligomer with a functionality less than 4;
    20 to 40 parts by weight of a morpholino-group containing acrylate monomer;
    10 to 40 parts by weight of a polymerizable acrylate monomer composition, wherein the polymerizable acrylate monomer composition comprises 40 to 60 parts by weight of an alicyclic acrylate monomer and 40 to 60 parts by weight of an ether-bond containing aliphatic acrylate monomer; and
    0.5 to 5 parts by weight of a photoinitiator;
    wherein the shore hardness of the resin composition after being cured is not less than 70D and the flexural strain thereof is not less than 0.15.

2. The resin composition for molding device for dental restoration as claimed in claim 1, wherein the tensile strength of the resin composition after being cured is not less than 25 MPa.

3. The resin composition for molding device for dental veneer restoration as claimed in claim 1, wherein the elongation at break of the urethane acrylate oligomer after being cured is not less than 30%.

4. The resin composition for molding device for dental veneer restoration as claimed in claim 1, wherein the functionality of the urethane acrylate oligomer is 2 or 3.

5. The resin composition for molding device for dental veneer restoration as claimed in claim 1, wherein the morpholino-group containing acrylate monomer is acryloylmorpholine.

6. The resin composition for molding device for dental veneer restoration as claimed in claim 1, wherein the functionality of the alicyclic acrylate monomer is 1 or 2.

7. The resin composition for molding device for dental veneer restoration as claimed in claim 1, wherein the ether-bond containing aliphatic acrylate monomer is selected from one of the group consisting of isobornyl acrylate, cyclohexyl acrylate, tricyclodecane dimethanol diacrylate, and 1,3-adamantanediol diacrylate, or combinations thereof.

8. The resin composition for molding device for dental veneer restoration as claimed in claim 1, wherein the glass transition temperature of the ether-bond containing aliphatic acrylate monomer is not less than 40° C.

9. The resin composition for molding device for dental veneer restoration as claimed in claim 1, wherein the ether-bond containing aliphatic acrylate monomer is selected from one of the group consisting of diethylene glycol diacrylate, tripropylene glycol diacrylate, 1,6-hexanediol diacrylate, and 1,9-nonanediol diacrylate, or combinations thereof.

10. The resin composition for molding device for dental veneer restoration as claimed in claim 1, wherein the photoinitiator is selected from one of the group consisting of acetophenones-based photoinitiator, diphenylketones-based photoinitiator, propiophenones-based photoinitiator, benzophenones-based photoinitiator, difunctional α-hydroxyketones-based photoinitiator, and acylphosphine oxides-based photoinitiator or combinations thereof.

11. The resin composition for molding device for dental veneer restoration as claimed in claim 1, wherein the ratio of the weight of the urethane acrylate oligomer to the total weight of morpholino-group containing acrylate monomer and the polymerizable acrylate monomer composition is ranging between 0.2 and 0.7.

12. The resin composition for molding device for dental veneer restoration as claimed in claim 1, further comprising 0.01 to 5 parts by weight of a filler.

* * * * *